United States Patent [19]

Milman

[11] Patent Number: 5,078,470
[45] Date of Patent: Jan. 7, 1992

[54] ONE-WAY PEEPHOLE

[76] Inventor: Uri Milman, Rehov Hachavatzelet 18/18, Migdal Haemek, Israel

[21] Appl. No.: 542,092

[22] Filed: Jun. 22, 1990

[30] Foreign Application Priority Data

Jul. 11, 1989 [IL] Israel ............................ 090922

[51] Int. Cl.⁵ .................... G02B 27/14; G02B 3/00
[52] U.S. Cl. ................................ 359/629; 359/744; 359/504
[58] Field of Search ............... 350/320, 171, 172, 453; 49/171

[56] References Cited

U.S. PATENT DOCUMENTS 4,273,956 6/1981 Wolfe ............................ 350/453

FOREIGN PATENT DOCUMENTS

1574813 9/1980 Japan ................................ 49/171

Primary Examiner—Bruce Y. Arnold
Assistant Examiner—Rebecca D. Gass
Attorney, Agent, or Firm—Edward Langer

[57] ABSTRACT

A door-mounted security peephole providing an undistorted view over a relatively large area by use of a beam splitter optical system. The peephole comprises a door-mounted housing containing a beam splitter and light source arranged so that light is reflected from the beam splitter and toward the area exterior of the door. An observer behind the door may view the door exterior area including a visitor at the door entrance. The visitor, however, cannot see the observer through the beam splitter, because of the light reflected therefrom, thus increasing the overall security aspect. The design exploits the contrast sensitivity of the human eye as a function of field brightness.

20 Claims, 7 Drawing Sheets

ONE-WAY PEEPHOLE

FIELD OF THE INVENTION

The present invention relates to peepholes, wickets, viewing ports and the like, and more particularly, to a novel door-mounted security peephole providing an undistorted view over a relatively large area by use of a beam splitter optical system.

BACKGROUND OF THE INVENTION

The prior art contains several examples of door-mounted security peepholes or viewing ports for establishing visual contact, allowing an indoor observer to view an area exterior to an entrance door. An example of a viewing assembly for a door is described in U.S. Pat. No. 4,763,444 to Ritchie, comprising a glass mounted between an inner and outer bezel, with a mirror on the outer bezel for reflecting images through the glass to an observer. A hinged cover over the inner bezel can be lifted by the observer when it is desired to view the exterior area. However, a disadvantage in this arrangement is that a visitor at the door entrance may establish visual contact with the observer, and this may be undesirable in certain circumstances.

U.S. Pat. No. 4,571,901 to Morris et al., describes a vandal-resistant security viewing port for permitting observation into a cell, and while a large viewing area is provided for the observer, again, an undesirable feature is that two-way visual contact with a visitor may be established. In U.S. Pat. No. 4,050,792 to Svensson, there is disclosed an observation port assembly comprising separate optical viewing elements each having an inner optical axis at an angle to an adjacent optical viewing element such that each provides a partial view of the exterior area. The individual optical elements do not provide for visual contact by the visitor with the observer, however, the field of view provided by any one of them is limited.

A viewing port for doors including a light polarizing assembly is described in U.S. Pat. No. 4,719,720 to Olsen. The light polarizing assembly comprises two linear polarized optical elements which are mounted for rotation with respect to one another to change the viewing port from light-passing to light-blocking or a reduced light transmission condition. The outer optical element may be half silvered on the front, reducing visibility from the exterior of the door to practically zero so that no visual contact is established on the part of the visitor with the observer. Visibility from the interior is also reduced due to the half-silver layer on the outer optical element, and the only means provided for controlling the residual light level is a handle for rotating the outer optical element, which comprises a polarizing disc. Since the residual light level depends upon the lighting conditions interior of the door and exterior thereto, the possibility exists that the observer will not be able to easily identify the visitor, because of insufficient light even though a large, undistorted viewing area is provided.

In U.S. Pat. No. 4,561,116 to Neyret, a known inspection glass peephole mounted in a door is provided with a semi-reflecting surface on the interior of the door such that the observer may see a visitor outside the door whereat the visitor notices only the outer portion of the inspection glass. The inspection glass provided in this design affords the observer only a limited field of view, making it difficult for the observer to identify a visitor.

As indicated above, the security aspect associated with the construction of door peepholes must take into account the fact that the observer should be provided with the maximum viewing area, while visual contact on the part of the visitor must be eliminated. These requirements increase the security aspect as the observer can easily identify the visitor, without providing him with any visual information about the observer or the door interior area.

Therefore, it would be desirable to provide a door-mounted security peephole which provides a large, undistorted viewing area while eliminating visual contact on the part of the visitor independent of existing light conditions.

SUMMARY OF THE INVENTION

Accordingly, it is a principal object of the present invention to overcome the above-mentioned disadvantages of prior art designs and provide a peephole which affords an observer with a large, undistorted viewing area by use of a novel optical system including a beam splitter and light illumination means for insuring one-way operation.

In accordance with a preferred embodiment of the invention, there is provided an optical system for use in a peephole mounted in a barrier such as a door, wall and the like, the optical system comprising:

a housing mounted in the barrier for providing an observation port to an area exterior of the barrier;

a beam splitter enclosed within the housing and defining an optical axis aligned with the observation port, the barrier exterior area being visible through the observation port and the beam splitter from a barrier interior area; and an illuminator for providing a light beam incident on a surface of the beam splitter at a first brightness level, such that a portion of the incident light beam is reflected therefrom and exits the housing via the observation port along the optical axis, light at a second brightness level from the barrier interior area being substantially non-visible at the observation port through the beam splitter concurrent with the refection therefrom of the incident light beam, when the first brightness level exceeds the second brightness level by a predetermined ratio.

In a preferred embodiment, the inventive peephole comprises a door-mounted housing containing a beam splitter and light source arranged so that light is reflected from the beam splitter and toward the area exterior of the door. An observer behind the door may view the door exterior area including a visitor at the door entrance, since the observer receives light through the beam splitter. Since the door exterior area is illuminated by reflected light from the light source, the observer may easily identify the visitor before opening the door.

However, the visitor cannot see the observer through the beam splitter, because of the light reflected therefrom. The invention utilizes an existing characteristic of the human eye, commonly known as the contrast sensitivity as a function of field brightness. Using this characteristic, the sensitivity of the eye to two differing levels of brightness is exploited. By deliberately creating a relatively large difference in the brightness levels of two images which are superimposed on the surface of the beam splitter, not only will it be difficult for the eye to differentiate between them, but the eye will only be able to see the image with the greater brightness level.

Thus, when light from the light source is reflected toward the visitor, the contrast sensitivity of his eyes makes it virtually impossible for him to see anything through the beam splitter, because of the dominant effect of the reflected light. In this fashion, the observer has the full benefit of a large, undistorted viewing area through the peephole while the visitor has no visual contact with the observer, thus increasing the overall security aspect.

In the preferred embodiment, the light source is enclosed within the peephole housing, and is operated by the observer when required for viewing the door exterior area. The light source may be automatically operated by lifting an inside peephole cover, or it may be operated by pushbutton control. Alternatively, after a time delay, the light source is automatically operated for a fixed interval by a sensor which detects a visitor.

In an alternative embodiment, the light source is provided in the door frame, and a light channel is provided through a portion of the door interior to the housing containing the beam splitter, such that electrical wiring on the door itself is eliminated.

In another alternative embodiment, a cube beam splitter is provided behind a relatively thick, reinforced pane of glass forming the observation port in the door-mounted housing. The cube beam splitter affords a wide field of view while providing a compact door-mounted design.

A feature of the invention is the provision of door-mounted photovoltaic cells which operate with rechargeable batteries mounted in the housing, which are used to power the light source provided as an LED. Thus, the inventive peephole is a self-contained unit which does not require external power. This permits the light source to be continuously lit, providing constant illumination of the door exterior area.

In still another alternative embodiment, the optical system of the inventive peephole includes a light beam collimator to provide the observer with a larger field of view and to collimate the light received from the door exterior area. The collimated light beam may be directed by reflection to the observer who, even while located at a distance from the door itself or behind a partition, still has a view of the door exterior area. In still a further alternative embodiment, the beam splitter is provided as a curved surface which allows for further compactness in the design.

Another feature of the Invention is the provision of a plurality of partially transparent slides, LCD or digital display segments in the housing of the optical system. In the case of the slides, these may contain imaging information, such that when placed in the path of the reflected light beam exiting the observation port to the door exterior area, the imaging information is viewable. Alternatively, the LCD or digital display segments may be connected to the power supply for display purposes. In this fashion, messages and other important information may be visually displayed in front of those approaching the door.

In another alternative embodiment, an electronic message unit is installed in the vicinity of the inventive peephole, allowing both the observer and visitors to leave and receive voice or display messages using an access code.

By virtue of its unique design, the inventive peephole provides an indoor observer with a large, undistorted viewing area which is illuminated to increase the ease with which visitors may be identified. Simultaneously, because the illumination is directed at him, the visitor is unable to make visual contact with the observer, thereby satisfying the requirement of a high level of security.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings in which like numerals designate corresponding elements or sections throughout, and in which.

DETAILED DESCRIPTION OF THE PREFERRED EMBODIMENTS

Figure 1:
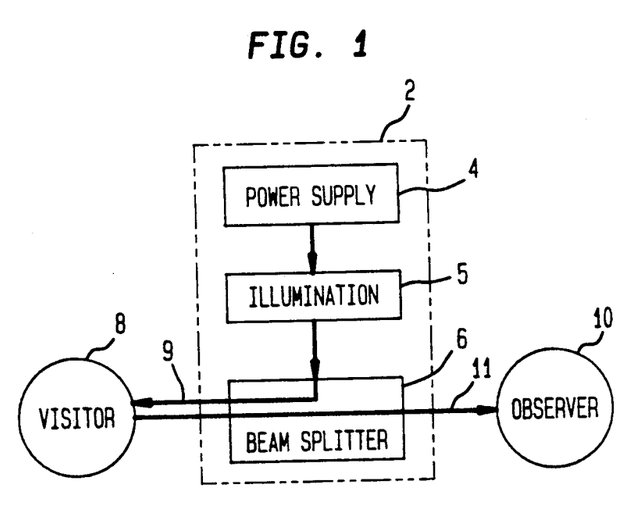
FIG. 1 is a block diagram of an optical system for a peephole constructed and operated in accordance with the principles of the present invention.

Referring now to FIG. 1, there is shown a block diagram of an optical system 2 for a peephole constructed and operated in accordance with the principles of the present invention. Optical system 2 comprises a power supply 4, an illumination means 5, and a beam splitter 6. Optical system 2 is typically mounted in a barrier such as a door, on opposite sides of which there are located a visitor 8 and an observer 10. When power supply 4 is operated, light in the visible spectrum is produced by illumination means 5. By choice of a suitable coating on the surface of beam splitter 6, a portion 9 of this light is reflected toward visitor 8 in a door exterior area, and observer 10 receives light 11 by which he can identify visitor 8.

However, visitor 8 cannot see observer 10 through beam splitter 6, because of light beam 9 reflected therefrom. The invention utilizes an existing characteristic of the human eye, commonly known as contrast sensitivity. As is known in the field of optical engineering, the contrast sensitivity of the human eye is best when there is no visible dividing line between areas under visual comparison, as discussed in the text "Modern Optical Engineering", W. J. Smith, McGraw Hill (1966), at pages 108-9. Using this characteristic, the sensitivity of the eye to two differing levels of brightness is exploited.

By deliberately creating a relatively large difference in the brightness levels of two images (light beam 9 and the ambient light at observer 10) which are superimposed on the surface of beam splitter 6, not only will it be difficult for the eye to differentiate between them, but the eye will only be able to see the image with the greater brightness level, namely that provided by reflected light beam 9. It is estimated that, using a beam splitter having a 50/50 transmission-reflection ratio, a minimum intensity relationship of approximately 5:1 is needed between light beam 9 and the ambient light at observer 10. Where a different transmission-reflection ration of beam spitter 6 is selected (e.g. 60/40, 70/30), the intensity relationship between light beam 9 and light 10 changes accordingly.

Thus, when reflected light 9 from illumination means 5 reaches visitor 8, the contrast sensitivity of his eyes makes it virtually impossible&for him to see anything through beam splitter 6, because of the dominant effect of reflected light 9. In this fashion, observer 10 has the full benefit of a large, undistorted viewing area through beam splitter 6 while visitor 8 has no visual contact with observer 10, thus increasing the overall security aspect.

Figure 2:
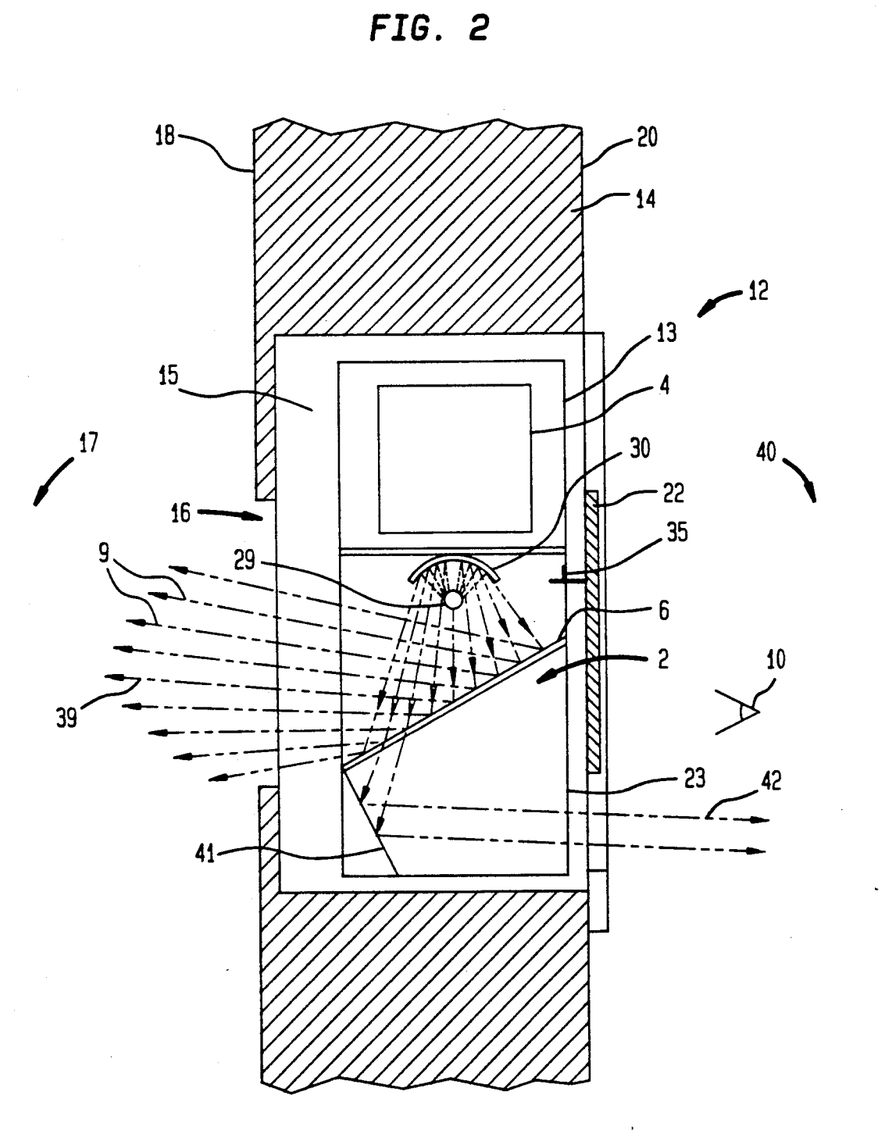
FIG. 2 is a cross-sectional view of a preferred embodiment of a peephole incorporating the optical system of FIG. 1.

Referring now to FIG. 2, there is shown a cross-sectional side view of a preferred embodiment of a door-mounted peephole 12 constructed and operated in accordance with the principles of the present invention. Peephole 12 comprises housing 13 mounted in a door 14 behind a piece of thick, reinforced glass 15 so as to define an observation port 16 facing an area 17 on an exterior side 18 of door 14. On the interior side 20 of door 14, a cover 22 is slidably mounted over an opening 23 of housing 13 substantially opposite observation port 16. Optical system 2 is contained within housing 13 and provides observer 10 with a large, undistorted viewing area through observation port 16.

In this embodiment as In the others depicted in the following drawings, illumination means 5 typically comprises light source 29 and reflector 30. Beam splitter 6 is typically provided with a 70/30 reflection-to-transmission ratio and is inclined at an angle of approximately 45 degrees to the vertical. In accordance with the principles of the invention, beam splitter 6 is designed to allow light 11 coming from door exterior area 17 to pass through it and reach the eyes of observer 10. Simultaneously, optical system 2 is designed to maintain a high degree of security by preventing visitor 8 approaching door 14 from having any visual contact with observer 10, by operation of light source 29.

In the preferred embodiment, a switch 35 is mounted on cover 22 such that when the latter is slid upwards in housing 13, power supply 4 is switched to deliver power to light source 29. The light provided by light source 29 illuminates door exterior area 17 with light beam 9 which is reflected from reflector 30 and beam splitter 6, along optical axis 39.

As described previously in connection with the contrast sensitivity characteristic of the human eye, any available light from the door interior area 40 which passes through beam splitter 6 towards observation port 16 will be overcome by the dominant effect presented by the illumination provided by light source 29, insuring no visual contact on the part of visitor 8 with door interior area 40. Even if observer 10 places h[s eyes directly against opening 23 of housing 13, visitor 8 will see only the light beam 9 reflected from beam splitter 6, originating from light source 29. Thus, one-way optical system 2 operation is assured.

As a safety feature, a mirror 41 is provided under beam splitter 6 to reflect a portion of the light 42 passing therethrough to door interior area 40. Thus, as cover 22 is being slid upwards but before observer 10 has a view through observation port 16, light 42 serves as an indication that optical system 2 is operative to eliminate visual contact of the visitor with door interior area 40, thereby maintaining security. Reflected light 42 may also be useful where light source 29 is wired to a backup power supply, for illumination in emergency lighting conditions.

Also in the preferred embodiment, power supply 4 may be a battery type, which together with light source 29, reflector 30 and switch 35 may be provided as a single unit in door housing 13. This design makes for convenient parts replacement when necessary after long periods. Any suitable power supply 4 may be used.

Figure 3A:
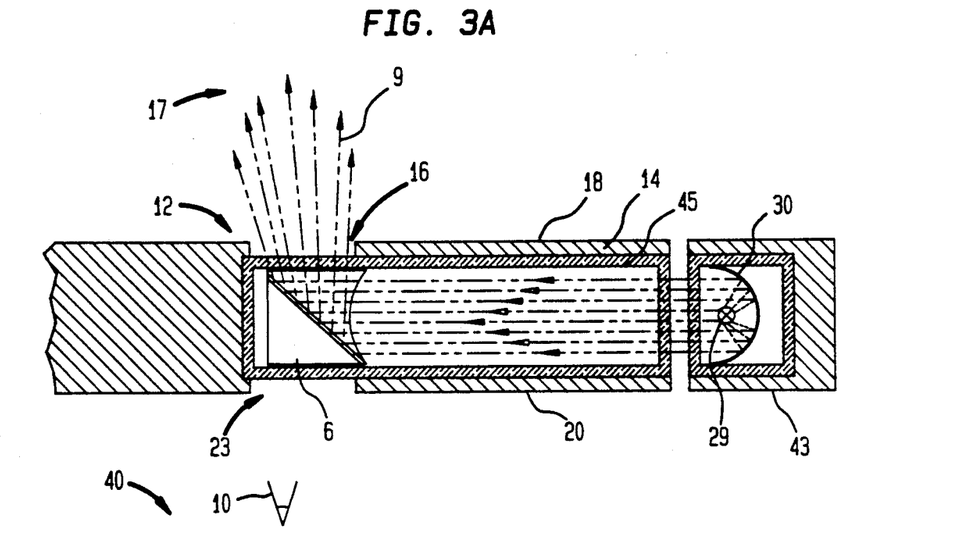
FIGS. 3a-b show, respectively, top and front cross-sectional views of an alternative embodiment of the optical system of FIG. 1, using an illumination source mounted on a door frame.
Figure 3B:
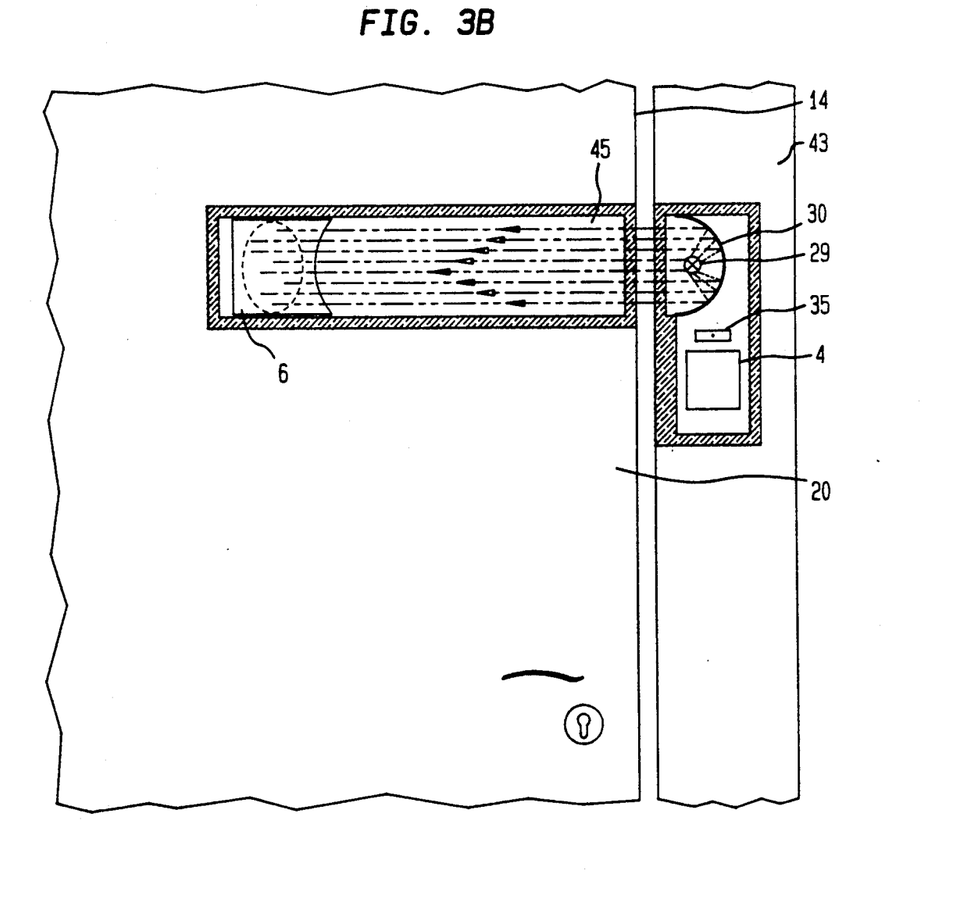

Referring now to FIGS. 3a–b, there are shown, respectively top and front cross-sectional views of an alternative embodiment of peephole 12. In this embodiment, light source 29 is mounted in a door frame 43, so as to eliminate the need for electrical wiring crossing the door 14 hinge. Reflector 30 is a collimating-type directing light from light source 29 via a hollow space formed in the door interior, which serves as a light channel 45. As shown, beam splitter 6 is a cube having a concave side, and is oriented so as to illuminate the door exterior area 17 by reflection of light beam 9 from light source 29. Cover 22 and mirror 41 are also provided (not shown).

As in the embodiment of FIG. 2, observer 10 may view the door exterior area .17, while visitor 8 approaching door 14 has no visual contact with him. FIG. 3b shows a detail of the door frame mounting of light source 29. Switch 35 s provided in door frame 43, allowing observer 10 control light source 29 by switching the power from power supply 4 as desired.

Figure 4:
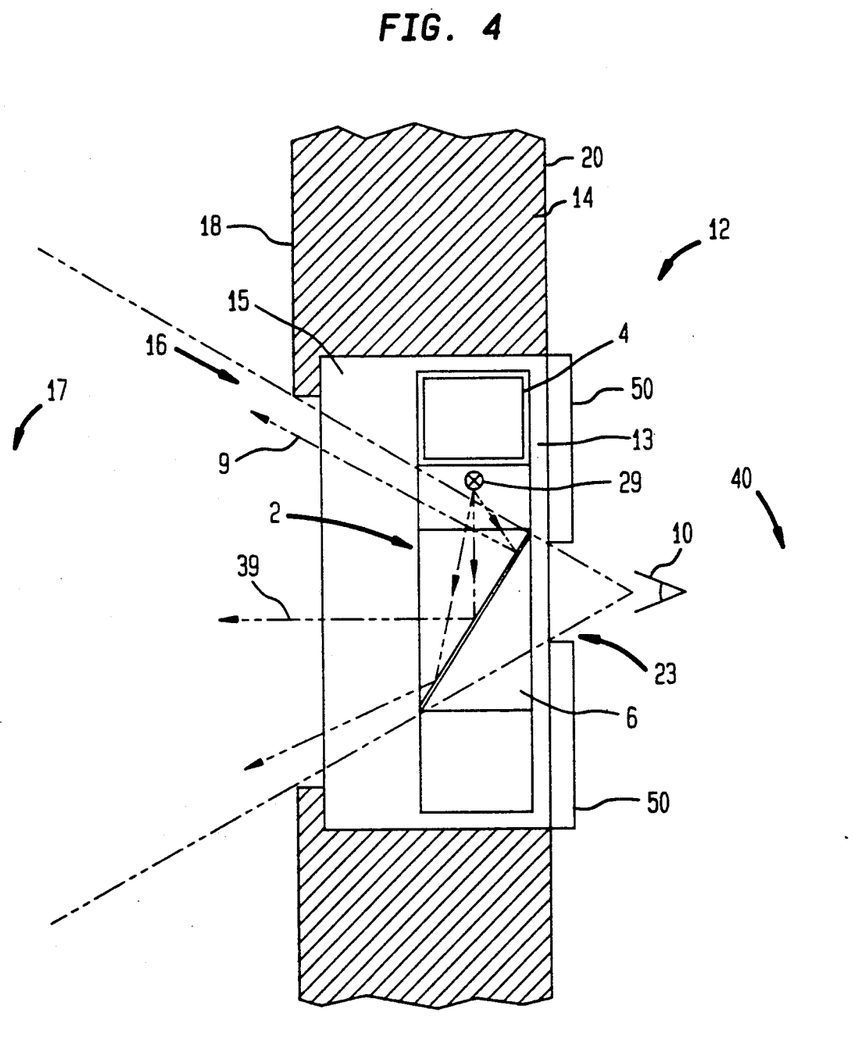
FIG. 4 shows a cross-sectional side view of another alternative embodiment of the optical system, utilizing a cube-type beam splitter.

As shown in the alternative embodiment of FIG. 4, a cube beam splitter 6 is used in order to conserve space in the width of housing 13. As a result, opening 23 used by observer 10 is smaller, but additional width Is available for use of an extra thick piece of glass 15 between housing 13 and observation port 16. This strengthens the overall construction, and deters burglars who might otherwise be tempted to break through peephole 12.

Power supply 4 is provided as a set of rechargeable batteries which are charged by a set of photovoltaic cells 50 mounted on the door interior 20. In addition, a compact design is possible by use of an LED for light source 29, which requires a low voltage and produces a high level of illumination, such as the 1363 series "Super Bright" type LED manufactured by Everlight. The LED light source 29 may be continuously operated so the door exterior area 17 is constantly illuminated. When so operated, housing cover 22 on the inside of door 14 may be eliminated, allowing observer 10 a continuous view through observation port 16 without concern for visual contact on the part of visitor 8. Alternatively, cover 22 and switch 35 are provided, with photovoltaic cells 50 mounted thereon.

Figure 5:
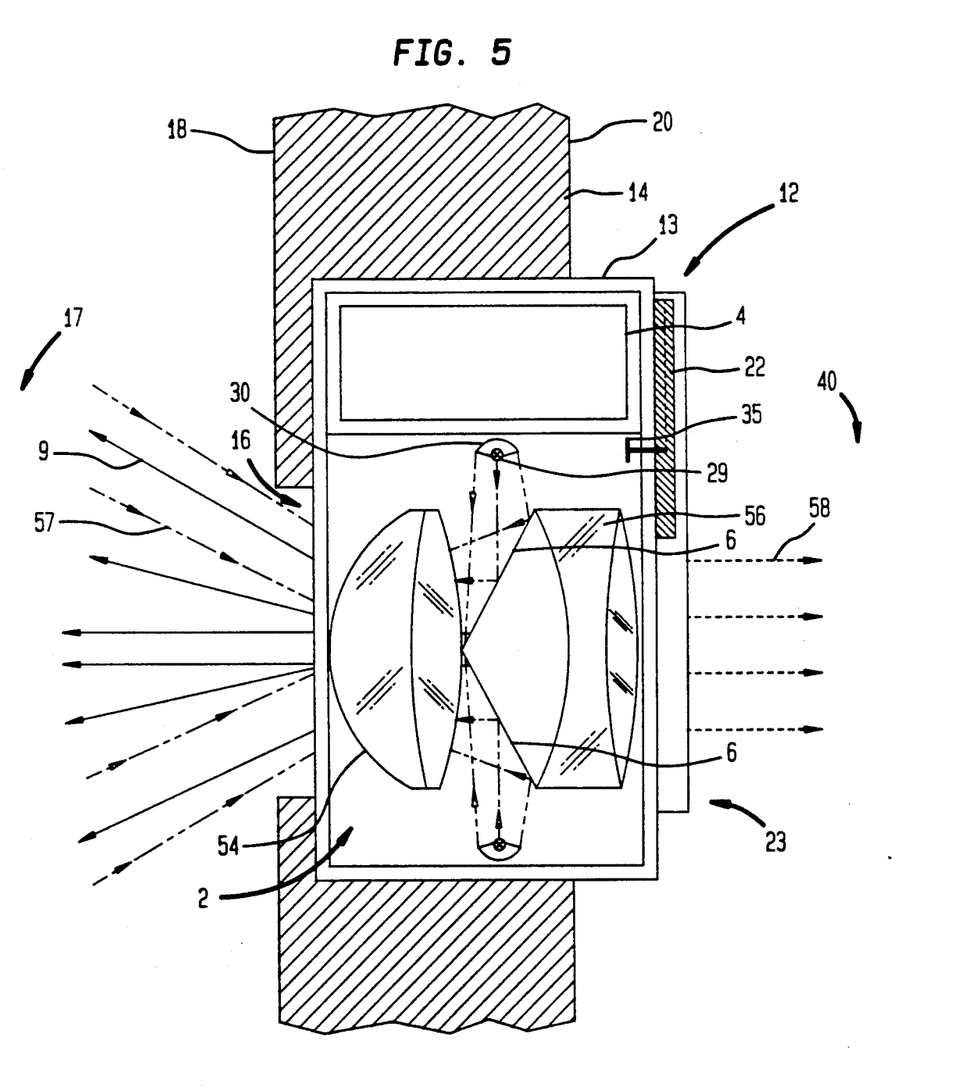
FIG. 5 shows a cross-sectional side view of still another alternative embodiment of the optical system wherein a wide angle lens and beam collimator are used.

Referring now to FIG. 5, another alternative embodiment of peephole 12 is shown in which optical system 2 is provided in modified form. As shown, a pair of light sources 29 is provided on either side of oppositely inclined beam splitters 6. A wide angle lens 54 is provided on the observation port 16 side of housing 13, and a lens 56 is arranged to provide a beam collimator for collimating the light 57 which is received through observation port 16 and which passes through beam splitters 6.

The collimated beam 58 provided in this arrangement can be directed to observer 10 even though he is located at a distance from door 14 or behind a partition, for remote viewing of door exterior area 17. An advantage of this embodiment is the provision of a wide-angle field of view with a high level of illumination provided by light sources 29. This arrangement provides optimal performance when a visitor Is within approximately one meter of observation port 16.

Figure 6:
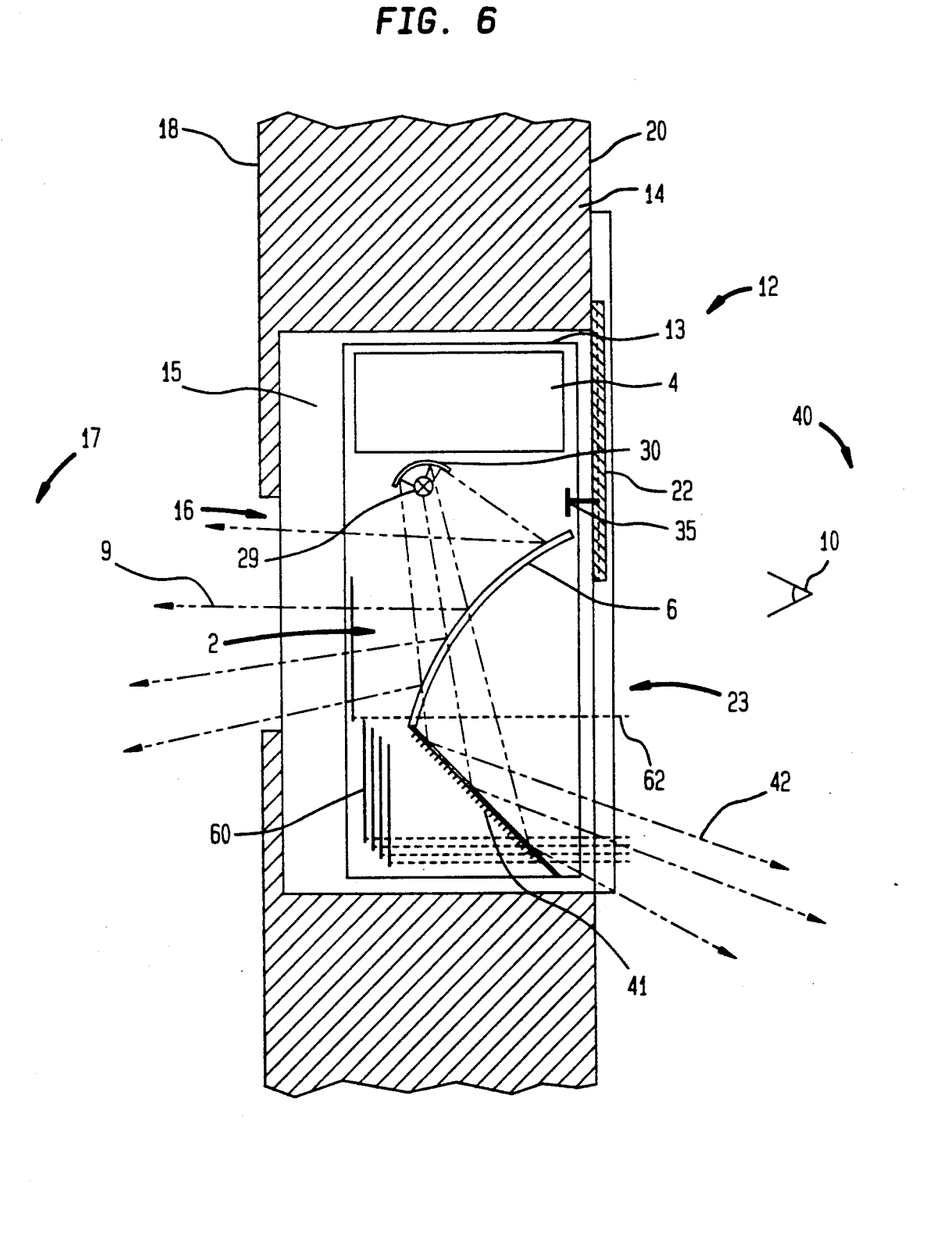
FIG. 6 shows a cross-sectional side view of yet another alternative embodiment of the optical system wherein a curved surface beam splitter is used, and messages may be viewed from a door exterior area.

Referring now to FIG. 6, still another alternative embodiment of peephole 12 is shown, in which a curved beam splitter 6 is provided for spreading the light reflected to door exterior area 17. Curved beam splitter 6 comprises a thin, semi-reflective layer on a curved surface and, as in the embodiment of FIG. 2, a portion of light 42 which passes directly therethrough reaches mirror 41 and is reflected towards door interior area 40. This provides observer 10 with an indication that light source 29 is operating before the slidable cover 22 has been completely lifted, thus assuring him that optical system 2 is operating properly.

A feature of this arrangement is the provision of a plurality of slides 60, each of which is disposed in housing 13 and can be moved vertically by a handle mechanism 62. When moved into position n optical system 2, each of the slides is illuminated by the light reflected by beam splitter 6, thus presenting a visitor with the image contained on the slide. These images may include words or graphic illustrations to convey a particular message as desired by the user. For example, if a visitor is expected, a particular message may he conveyed such as "shall return shortly" to indicate a temporary absence.

Alternatively, individual slides 60 may be arranged to move in and out of position in optical system 2 automatically, using suitable electromechanical means operated by the electrical power supplied to light source 29. Slides 60 may be replaced by a LCD or digital segment display, operated by power supply 4.

Figure 7:
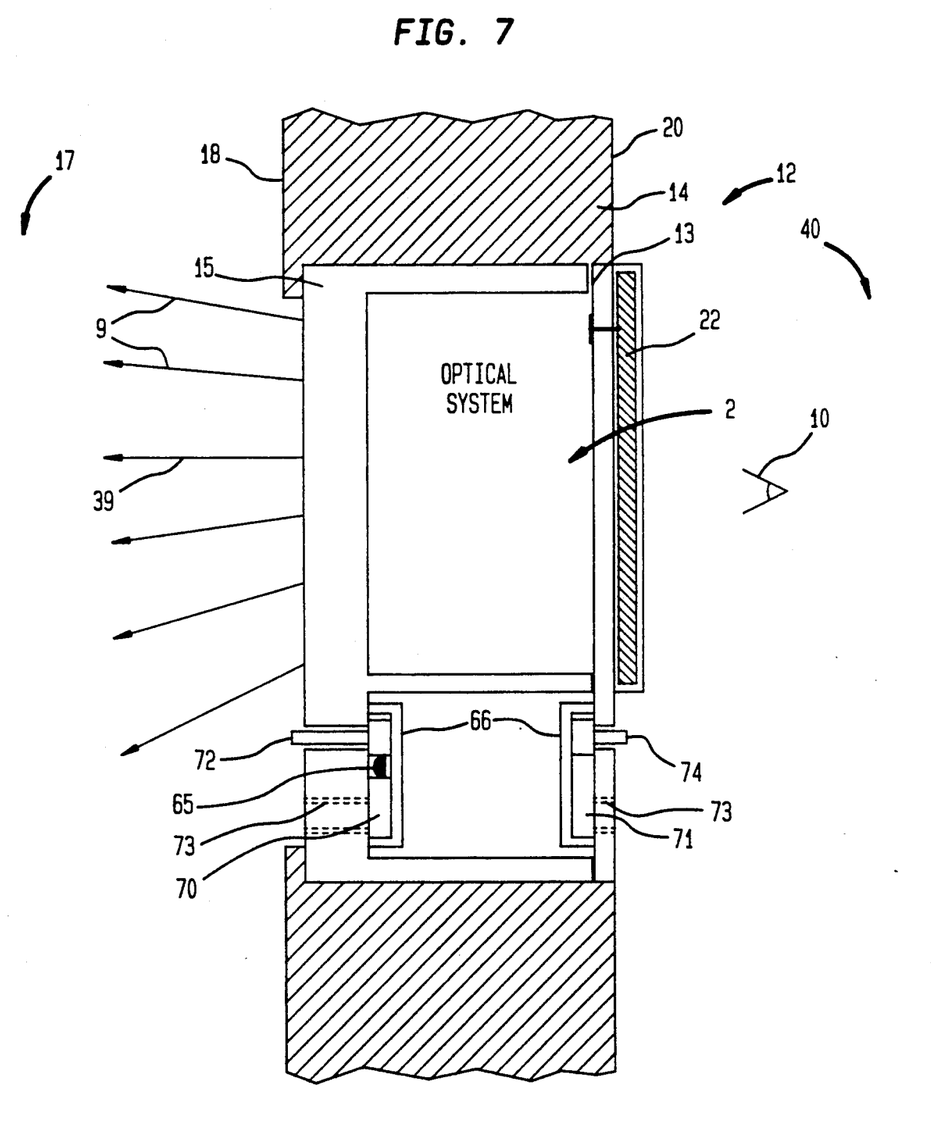
FIG. 7 shows a cross-sectional side view of a further alternative embodiment of FIG. 6 with a visitor detection sensor and electronic message unit.

In another alternative embodiment, a sensor 65 is provided in the line-of-sight with door exterior area 17 as part of an electronic unit 66 incorporated in housing 13. Electronic unit 56 is powered by the power supply, and operates light source 29 for a fixed interval when sensor 65 detects the presence of a visitor after a time delay. Sensor 65 may be an infra-red type.

Also included in electronic unit 66 is a message unit, which may be a voice message unit, which electronically plays messages or records them via a small microphone/speaker unit 70, 71 (mounted behind small holes 73) and RAM memory. A code access via pushbutton keys 72 can be developed to allow certain visitors to leave messages, or to retrieve them. The observer 10 can store or retrieve messages without this code via keys 74. An LCD display can also be used.

In summary, based on its unique design, the inventive peephole provides an observer with a large, undistorted viewing area which is illuminated to increase the ease with which visitors may be identified. Simultaneously, because the illumination is directed at him, the visitor makes no visual contact with the observer, providing a high level of security.

Having described the invention with regard to certain specific embodiments, it is to be understood that the description is not meant as a limitation since further modifications will now suggest themselves to those skilled in the art, and it is intended to cover such modifications as fall within the scope of the appended claims.

I claim:

1. An optical system for use in a peephole mounted in a barrier such as a door, wall and the like, said optical system comprising:
   a housing mounted in the barrier for providing an observation port to an area exterior of the barrier;
   beam splitter means enclosed within said housing and defining an optical axis aligned with said observation port, said barrier exterior area being visible through said observation port and said beam splitter means from a barrier interior area; and
   illumination means for providing a light beam Incident on a surface of said beam splitter means at a first brightness level, such that a portion of said incident light beam is reflected therefrom and exits said housing via said observation port along said optical axis,
   light at a second brightness level from said barrier interior area being substantially non-visible at said observation port through said beam splitter means concurrent with the reflection therefrom of said incident light beam, when said first exceeds said second brightness level by a predetermined ratio.

2. The optical system of claim 1 wherein said predetermined ratio is defined by the contrast sensitivity to brightness as perceived by the human eye.

3. The optical system of claim 1 wherein said beam splitter means comprises a glass oriented at a 45 degree angle to the vertical and coated with semi-reflective layer on a surface thereof, said layer having a 70/30 reflection-transmission ratio.

4. The optical system of claim 1 wherein said beam splitter means comprises a cube beam splitter.

5. The optical system of claim i wherein said beam splitter means comprises a curved glass surface coated with a thin semi-reflective layer on one side.

6. The optical system of claim 1 wherein said illumination means comprises a power supply and light source mounted in said housing and operable by an observer when required for viewing said barrier exterior area.

7. The optical system of claim 6 further comprising a set of photovoltaic cells operable to recharge said power supply which is provided as a set of rechargeable batteries, said batteries being operable to continuously power said light source provided as an LED.

8. The optical system of claim 1 wherein said illumination means comprises a power supply and light source mounted in said housing and continuously illuminating said barrier exterior area.

9. The optical system of claim 1 wherein said barrier is a door and said illumination means comprises a power supply and light source provided in the door frame, a light channel provided through a portion of the door interior passing light to said beam splitter means.

10. The optical system of claim 1 wherein said illumination means may be automatically operated by lifting an inside peephole cover over an opening in said housing.

11. The optical system of claim 1 further comprising a sensor to detect the presence of a visitor in said barrier exterior area and operate said illumination means for a fixed interval after a predetermined time delay.

12. The optical system of claim 1 further comprising a relatively thick pane of reinforced glass between said observation port and said housing.

13. The optical system of claim 1 further comprising a wide angle lens and a light beam collimator each disposed on respective sides of said beam splitter means, said wide angle lens providing a relatively larger field of view via said observation port and said light beam collimator providing collimated light from said barrier exterior area to other optical systems.

14. The optical system of claim 1 further comprising at least one partially transparent slide disposed in said housing which is positionable in the path of said reflected light beam portion so as to display information.

15. The optical system of claim 1 further comprising an electronic message unit for displaying messages entered by following a key depression sequence including a coded access.

16. The optical system of claim 1 further comprising an electronic message unit for recording and playing voice messages stored following a key depression sequence including a coded access.

17. A method of viewing an area exterior to a barrier from within comprising the steps of:

providing an optical system having an observation port for allowing a view of the barrier exterior area through a beam splitter; and generating light in said optical system for incidence on a surface of said beam splitter, a reflected portion of said incident light illuminating the barrier exterior area, the light received at said observation port being passed to a barrier interior area through the other side of sad light beam splitter, said barrier interior area being substantially non-visible through said observation port concurrent with the exit therefrom of said reflected light portion.

18. The method of claim 17 wherein said light generating step comprises operation of a light source when said observation port is used.

19. The method of claim 17 wherein said light generating step comprises continuous operation of a light source.

20. The method of claim 17 further comprising the step of sensing the presence of a visitor before said light generating step, and wherein said light generating step is performed after a time delay for a fixed interval.

* * * * *